US008756433B2

(12) United States Patent
Paley et al.

(10) Patent No.: US 8,756,433 B2
(45) Date of Patent: Jun. 17, 2014

(54) ASSOCIATING POLICY WITH UNENCRYPTED DIGITAL CONTENT

(75) Inventors: Mark E. Paley, Redmond, WA (US); Stephen P. DiAcetis, Duvall, WA (US); Clifford P. Strom, Sammamish, WA (US); Kedarnath A. Dubhashi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 951 days.

(21) Appl. No.: 12/684,522

(22) Filed: Jan. 8, 2010

(65) Prior Publication Data

US 2011/0173454 A1    Jul. 14, 2011

(51) Int. Cl.
H04L 29/06    (2006.01)

(52) U.S. Cl.
USPC ......................................................... 713/189

(58) Field of Classification Search
USPC ................................................. 713/189
See application file for complete search history.

(56) References Cited

U.S. PATENT DOCUMENTS

| 7,058,685 | B1 | 6/2006 | van Zee et al. | |
| 7,581,094 | B1 | 8/2009 | Apostolopoulos et al. | |
| 2007/0174919 | A1* | 7/2007 | Raines et al. | 726/27 |
| 2009/0007279 | A1* | 1/2009 | Alkove et al. | 726/28 |
| 2009/0106850 | A1 | 4/2009 | Robert et al. | |
| 2009/0210698 | A1 | 8/2009 | Candelore | |

OTHER PUBLICATIONS

Liu, et al., "Digital Rights Management for Content Distribution", Retrieved at, <<http://www.crpit.com/confpapers/CRPITV21ALiu.pdf>>, Proceedings of the Australasian information security workshop conference on ACSW frontiers 2003—vol. 21, pp. 49-58.
Chong, et al., "Security Attributes Based Digital Rights Management", Retrieved at, <<http://inter-actief.cs.utwente.nl/~summer/publications/Security%20Attribute%20based%20Digital%20Rights%20Management.pdf>>, Proceedings of the Joint International Workshops on Interactive Distributed Multimedia Systems and Protocols for Multimedia Systems: Protocols and Systems for Interactive Distributed Multimedia, Jun. 3, 2002, pp. 1-18.
"AES Implementations", Retrieved at, <<http://en.wikipedia.org/wiki/AES_implementations>>, Oct. 22, 2009, pp. 4.
Traw, C. Brendan S., "Technical Challenges of Protecting Digital Entertainment Content", Retrieved at, <<http://ieeexplore.ieee.org/stamp/stamp.jsp?arnumber=01212693>>, vol. 36, Issue 7, Jul. 2003, pp. 72-78.
Sun, et al., "An Improved Identity-Based DRM System", Retrieved at, <<http://docs.naocan.com/ISC2005/paper/ISC088.pdf>>, 2005, pp. 8.

* cited by examiner

Primary Examiner — Hadi Armouche
Assistant Examiner — Dao Ho
(74) Attorney, Agent, or Firm — Micah Goldsmith; Glen Johnson; Micky Minhas

(57) ABSTRACT

A content license associated with unencrypted digital content is generated, the content license including both an identifier of the unencrypted digital content and a content policy. At a user device, a determination is made as to whether the content license corresponds to particular unencrypted digital content. Use of the particular unencrypted digital content by the computing device is permitted in accordance with the content policy if the content license corresponds to the particular unencrypted digital content. However, use of the particular unencrypted digital content by the computing device based on the content license is prohibited if the content license does not correspond to the particular unencrypted digital content.

20 Claims, 9 Drawing Sheets

ASSOCIATING POLICY WITH UNENCRYPTED DIGITAL CONTENT

BACKGROUND

Developers of digital content oftentimes desire to protect their content so that it can be used only by those having the right to do so. One way in which digital content can be protected is encrypting the digital content and providing to those who have the right to use the digital content an encryption key that can be used to decrypt the digital content. Such use of encryption, however, is not without its problems. For example, decrypting digital content can be a resource-intensive process that takes a significant amount of time to perform on a user's device. Such delays can lead to user frustration and unhappiness with their devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, an identifier of unencrypted digital content is obtained. A content license associated with the unencrypted digital content is generated, the content license including both the identifier of the unencrypted digital content and a content policy. The content license is communicated to a target device, allowing the target device to use the unencrypted digital content in accordance with the content policy.

In accordance with one or more aspects, a content license including a content policy is obtained, and a determination is made as to whether the content license corresponds to unencrypted digital content. Use of the unencrypted digital content by the computing device is permitted in accordance with the content policy if the content license corresponds to the unencrypted digital content and the content license was intended for the computing device. However, use of the unencrypted digital content by the computing device based on the content license is prohibited if the content license does not correspond to the unencrypted digital content or the content license was not intended for the computing device.

BRIEF DESCRIPTION OF THE DRAWINGS

The same numbers are used throughout the drawings to reference like features.

DETAILED DESCRIPTION

Figure 1:
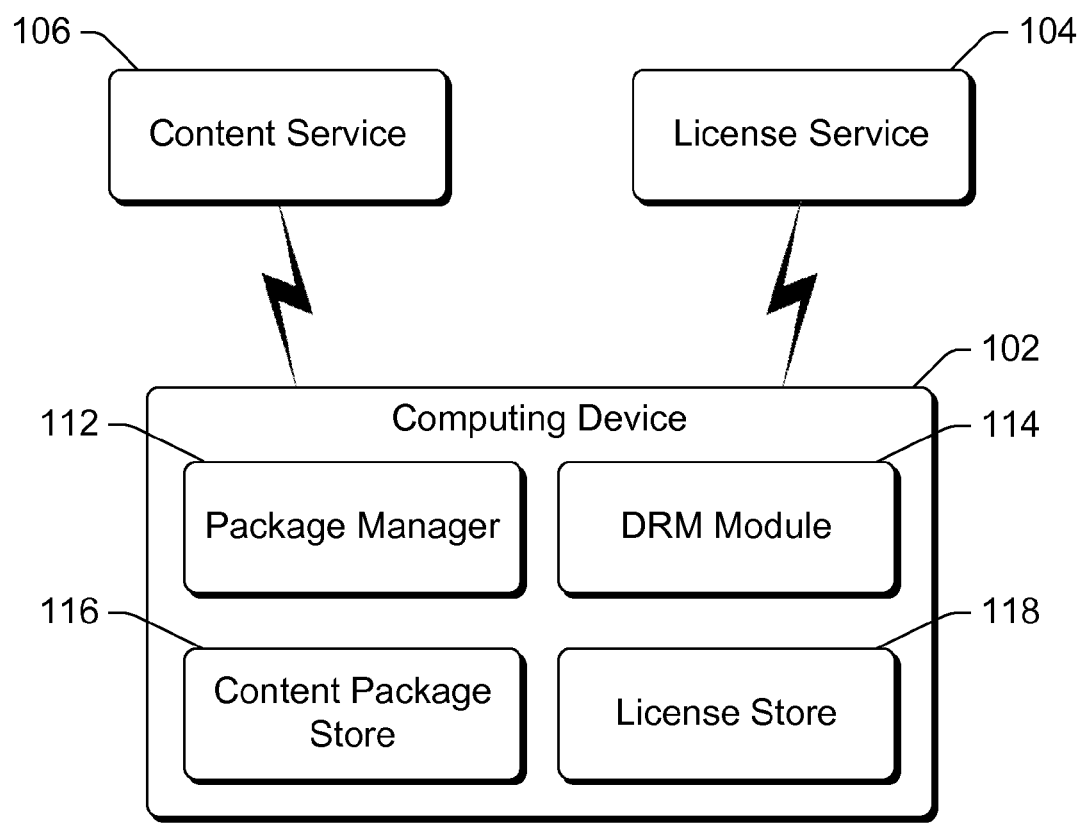
FIG. 1 illustrates an example system implementing the associating policy with unencrypted digital content in accordance with one or more embodiments.

Associating policy with unencrypted digital content is discussed herein. Digital content is distributed to various user devices in unencrypted form, and the unencrypted digital content is associated with a content license intended for a particular user device or set of user devices. The content license includes both a content policy that identifies rights a user device has regarding using the digital content, and information identifying the digital content so that the content license is associated with the digital content. One or more portions of the content license are integrity protected, and are also bound to the intended user device so that the license can be used by the user device that is the target device of the content license but not by other user devices. The user device allows the digital content to only be used in accordance with the content policy in the content license associated with the digital content.

References are made herein to symmetric key cryptography, public key cryptography and public/private key pairs. Although such key cryptography is well-known to those skilled in the art, a brief overview of such cryptography is included here to assist the reader. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by executing a suitable digital signature verification algorithm on the public key, the signature, and the data that was signed.

In symmetric key cryptography, on the other hand, a shared key (also referred to as a symmetric key) is known by and kept secret by the two entities. Any entity having the shared key is able to decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key. Additionally, symmetric key cryptography can be used as a basis for generating a digital signature for data. For example, a trusted third party can generate a symmetric key based on an identity of a particular entity, and then can both create and verify digital signatures for that particular entity (e.g., by encrypting or decrypting the data using the symmetric key).

FIG. 1 illustrates an example system 100 implementing the associating policy with unencrypted digital content in accordance with one or more embodiments. System 100 includes a computing device 102 that can communicate with a license service 104 and a content service 106. Computing device 102 can communicate with services 104 and 106 via a variety of different networks, including the Internet, a local area network (LAN), a public telephone network, an intranet, other public and/or proprietary networks, combinations thereof, and so forth.

Computing device 102 is typically used by a user to run or playback digital content, and thus is also referred to as a user device. Computing device 102 can be a variety of different types of devices. For example, computing device 102 can be a desktop computer, a laptop or netbook computer, a mobile station, an entertainment appliance, a set-top box communicatively coupled to a display device, a television, a cellular or other wireless phone, a game console, an automotive computer, and so forth. Thus, computing device 102 may range from a full resource device with substantial memory and processor resources (e.g., personal computers, game consoles) to a low-resource device with limited memory and/or processing resources (e.g., traditional set-top boxes, handheld game consoles).

Services 104 and 106 can each be implemented as one or more computing devices. Similar to the discussion of computing device 102, services 104 and 106 can each be implemented using one or more of a variety of different types of devices, ranging from full resource devices with substantial memory and processor resources to low-resource devices with limited memory and/or processing resources.

Content service 106 manages the distribution of digital content. In one or more embodiments, digital content is managed as content packages as discussed in more detail below. Digital content can include one or more of a variety of types of content, such as binary code or other computer executable code, script files, other instructions and/or data for execution, audio data, video data, combinations thereof, and so forth. Digital content is communicated from content service 106 to computing device 102. Alternatively, digital content can be communicated to computing device 102 from other sources, such as other computing devices.

Digital content can be communicated to computing device 102 in response to a variety of different events. For example, digital content can be communicated to computing device 102 in response to a request for digital content from a user of device 102, a request from a module or component of computing device 102, a request from a user of content service 106, a request from another device, and so forth.

License service 104 manages the distribution of content licenses. Each content license includes both a content policy that identifies one or more rights computing device 102 has regarding using digital content associated with the content license, and information identifying the particular digital content that is associated with or corresponds to the content license. Different digital content can be associated with or correspond to different content licenses, so computing device 102 can have different rights for different digital content. This associating of a content license and digital content is also referred to as binding the content license and digital content to one another. The content license, or portions thereof, is protected so that it can be used by computing device 102 but not by other user devices. Accordingly, the content license is referred to as intended for or targeting computing device 102 (and computing device 102 is referred to as the target device of the content license). It is to be appreciated that multiple different digital content can be associated with the same content license, and/or multiple content licenses can be associated with the same digital content.

It should be noted that license service 104 relies on and trusts the target computing devices to enforce the content licenses. For example, license service 104 assumes that the digital rights management module on the computing device that enforces the content license has not been compromised.

The particular content policy in a content license can be determined in a variety of different manners. License service 104 can determine the content policy for a content license, or alternatively license service 104 can obtain an indication of the content policy for a content license from another device or service. The content policy can depend on, for example, whether an appropriate fee has been paid for particular rights, the desires of the author or developer of the digital content, the desires of an administrator of license service 104, and so forth.

Content licenses can be communicated to computing device 102 in response to a variety of different events. For example, a content license can be communicated to computing device 102 in response to a request for digital content from a user of device 102, in response to a request from content service 106, in response to a user request to playback, run, or otherwise use digital content on computing device 102, and so forth.

Content service 106 and license service 104 are illustrated as two separate services in system 100. It is to be appreciated, however, that services 106 and 104 can be implemented as a single service. It is also to be appreciated that the functionality of one or both of services 106 and 104 can be separated into multiple services.

Computing device 102 includes a package manager 112, a digital rights management (DRM) module 114, a content package store 116, and a license store 118. Package manager 112 manages the receipt of digital content in the form of content packages at computing device 102. The received content packages are stored in content package store 116. Although illustrated as part of computing device 102, content package store 116 can alternatively be implemented separately from computing device 102, such as on another device coupled to computing device 102 (e.g., via network), on a removable device, and so forth.

Package manager 112 also manages the receipt of content licenses from license service 104. The received content licenses are stored in license store 118. Although illustrated as part of computing device 102, license store 118 can alternatively be implemented separately from computing device 102, such as on another device coupled to computing device 102 (e.g., via network), on a removable device, and so forth.

DRM module 114 enforces digital rights on computing device 102. This enforcement of digital rights includes allowing use of unencrypted digital content on computing device 102 that is consistent with the content policy in the content license associated with the unencrypted digital content. When accessing unencrypted digital content, DRM module 114 attempts to obtain a content license associated with the unencrypted digital content. This attempt can be an attempt to obtain any content license associated with the unencrypted digital content, and/or an attempt to obtain a content license having the desired policy (e.g., having the content policy to permit performing of a requested action, such as running the digital content).

Each content license includes information identifying the associated unencrypted digital content. Additionally, a content license generated as targeting computing device 102 includes one or more portions that allow the content license to be used by computing device 102 but not by other user devices. It should be noted that computing device 102 can be one of a set of multiple devices allowed to use the content license, as discussed in more detail below. DRM module 114 can obtain a content license from a variety of different sources, such as license store 118 or license service 104. For example, DRM module 114 can first check license store 118 for a content license associated with the content package and use such content license if found in store 118. The content license being checked for is a content license with the desired policy (a policy permitting a particular requested action). If no such license is found in store 118, then DRM module 114 can request such a content license from license service 104. This request for the content license from license service 104 can optionally involve additional user input, such as user permission to access license service 104, user permission to purchase a content license from license service 104, and so forth.

If DRM module 114 is able to obtain a content license that has the desired policy, is associated with the unencrypted digital content, and is intended for computing device 102, then DRM module 114 permits use of the unencrypted digital content on computing device 102 in accordance with the content policy in the content license associated with the unencrypted digital content. If DRM module 114 is not able to obtain a content license that has the desired policy, is associated with the unencrypted digital content, and is intended for computing device 102, then DRM module 114 prohibits use of the unencrypted digital content on computing device 102. However, if DRM module 114 were able to obtain at a later time a content license that has the desired policy, is associated with the unencrypted digital content, and is intended for computing device 102, then DRM module 114 permits use of the unencrypted digital content on computing device 102 at that later time in accordance with the content policy in the content license associated with the content package.

Figure 2:
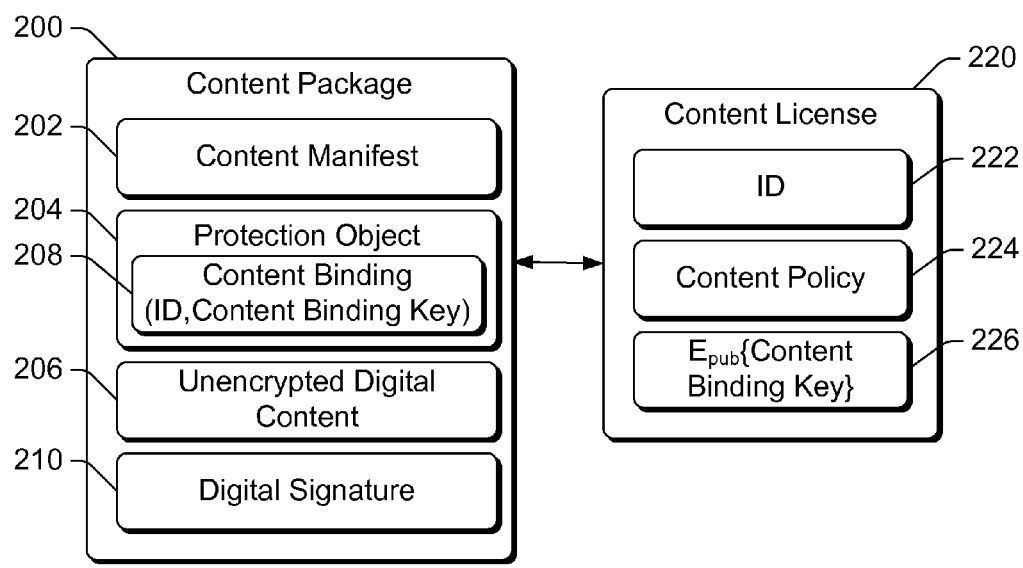
FIG. 2 illustrates an example content package and an example associated content license in accordance with one or more embodiments.

FIG. 2 illustrates an example content package and an example associated content license in accordance with one or more embodiments. Content package 200 includes a content manifest 202, a protection object 204, and unencrypted digital content 206. Content package 200 is generated by a content service (e.g., content service 106 of FIG. 1) or alternatively by another device or service. Unencrypted digital content 206 is the unencrypted digital content communicated to a computing device as discussed above. Content manifest 202 includes various metadata corresponding to unencrypted digital content 206. A variety of different types of metadata can be included in content manifest 202, such as an identifier of unencrypted digital content 206, information identifying a type of content that is unencrypted digital content 206, a size or other characteristics of unencrypted digital content 206, an identification of different portions of unencrypted digital content 206, and so forth.

Protection object 204 includes data used to associate content package 200 with content license 220. Protection object 204 is generated based on a secret that is known to the service generating content package 200 as well as to the service generating content license 220. This secret is used to generate protection object 204 and is also included in content license 220 in a manner that allows the secret to be retrieved by the user device that is the target device of content license 220 but not by other user devices.

In one or more embodiments, protection object 204 is generated based on a secret content binding key that is known to the service generating content package 200 as well as to the service generating content license 220. This content binding key is used in conjunction with an identifier of unencrypted digital content 206 to generate an encryption or content binding value 208. Content binding value 208 is calculated, for example, by using the content binding key as a symmetric key to encrypt the identifier of unencrypted digital content 206. A variety of different encryption algorithms can be used to encrypt the identifier of unencrypted digital content 206, such as the AES-ECB (Advanced Encryption Standard—Electronic Codebook) algorithm, other block ciphers or stream ciphers, and so forth.

The identifier of unencrypted digital content 206 that protection object 204 is based on can take a variety of different forms. The identifier of unencrypted digital content 206 is used to distinguish different unencrypted digital content from one another and thus is selected so as to uniquely (or almost uniquely) identify unencrypted digital content 206. For example, the identifier of unencrypted digital content 206 can be a GUID (globally unique ID) assigned to unencrypted digital content 206, a hash value generated by applying a hash function to unencrypted digital content 206, a hash value generated by applying a hash function to a particular portion of unencrypted digital content 206, a particular portion of unencrypted digital content 206, and so forth. A variety of different hash functions can be used with the techniques discussed herein, including cryptographic hash functions and non-cryptographic hash functions. In one or more other embodiments, the identifier of unencrypted digital content 206 is a set of one or more hash values or fingerprints generated by applying a hash function or other fingerprinting function to one or more public keys used to generate digital signatures of unencrypted digital content 206. These digital signatures can be, for example, digital signatures of binary executable files included in unencrypted digital content 206.

It should be noted that digital content 206 need not be encrypted. One or more portions of content package 200 can be encrypted, such as the identifier of digital content 206 that is encrypted as content binding value 208. However, digital content 206 itself can remain unencrypted, thus alleviating user devices from the resource and time burden of decrypting digital content.

Content package 200 also includes a digital signature 210. Digital signature 210 can be included separately in content package 200 or alternatively elsewhere in content package 200 (e.g., as part of content manifest 202). The digital signature is generated, for example, using the private key of the content service that generated content package 200 or alternatively by another trusted entity. The digital signature is generated by digitally signing unencrypted digital content 206 and optionally protection object 204 and/or content manifest 202. This digital signature, along with the public key of the content service or other trusted entity, can be used (e.g., by DRM module 114 of FIG. 1) to verify that unencrypted digital content 206 was not altered since being digitally signed.

Content license 220 includes an identifier 222 of unencrypted digital content 206, a content policy 224, and an encrypted content binding key 226. Identifier (ID) 222 is the same identifier of unencrypted digital content 206 as is used to generate content binding value 208. Encrypted content binding key 226 is the same secret content binding key as is used to generate content binding value 208, but is encrypted using the public key of the device that is the target device of content license 220. The content binding key is encrypted by, for example, license service 104 of FIG. 1. By encrypting the content binding key with the public key of the target device of content license 220, the license service can be assured that the target device of content license 220 can decrypt and recover the content binding key but that other user devices are unable to do so. This encrypting of the content binding key can thus be used to indicate that content license 220 is intended for the target device having the public key used for the encrypting. Additional keys or other information can optionally be encrypted (along with the content binding key) using the public key of the target device of content license 220. Alternatively, rather than being encrypted with the public key of the target device, the secret content binding key can be protected using a variety of other secret assets the server can generate and provide to the target device as part of content license 220.

It should be noted that this public key of the target device can be specific to a single target device or alternatively to a set of multiple target devices. Thus, the encrypting of the content binding key can be used to indicate that content license 220 is intended for any target device having the private key corresponding to the public key used for encrypting (that is, any target device in the set of multiple target devices). For example, the content binding key can be encrypted using the public key of an OEM (original equipment manufacturer) of multiple target devices, using the public key of a service operator (e.g., a particular wireless carrier), using the public key of a particular model of target device, and so forth.

In one or more embodiments, content license 220 is also integrity protected to protect against tampering. This integrity protection can be provided, for example, with a digital signature generated by digitally signing one or more portions of content license 200 (e.g., content policy 224 and identifier 222). Alternatively, one or more of such portions of content license 220 can be encrypted (along with the content binding key) using the public key of the target device of content license 220.

Accordingly, DRM module 114 of FIG. 1 can use identifier 222 and encrypted content binding key 226 to determine whether content license 220 is bound to content package 200. The target device of content license 220 can use its private key to decrypt the content binding key from encrypted content binding key 226. Given the content binding key, as well as identifier 222, DRM module 114 can generate a content binding value in the same manner as content binding value 208 was generated. If the content binding value generated by DRM module 114 matches (is the same as) content binding value 208, then DRM module 114 knows the content binding values were generated using the same content binding key and same identifier of unencrypted digital content 206, and thus the content license 220 and content package 200 are bound to or associated with one another. If the content binding value generated by DRM module 114 does not match (is not the same as) content binding value 208, then DRM module 114 knows the content binding values were not generated using the same content binding key and/or same identifier of unencrypted digital content 206, and thus that the content license 220 and content package 200 are not bound to or associated with one another.

Content policy 224 identifies access rights or access policy for a user device using unencrypted digital content 206. A variety of different rights can be identified in content policy 224, such as the right to run or execute unencrypted digital content 206 for a particular amount of time, the right to run or execute unencrypted digital content 206 a particular number of times, the right to run or execute unencrypted digital content 206 without any constraints, the right to read or play back unencrypted digital content 206, the right to copy unencrypted digital content 206, the right to alter unencrypted digital content 206, the write to burn digital content 206 to a disc, and so forth. If content license 220 is not bound to content package 200, then content policy 224 does not grant any rights to the user device to use unencrypted digital content 206. However, if content license 220 is bound to content package 200, then DRM module 114 permits use of unencrypted digital content 206 in accordance with content policy 224.

Figure 3:
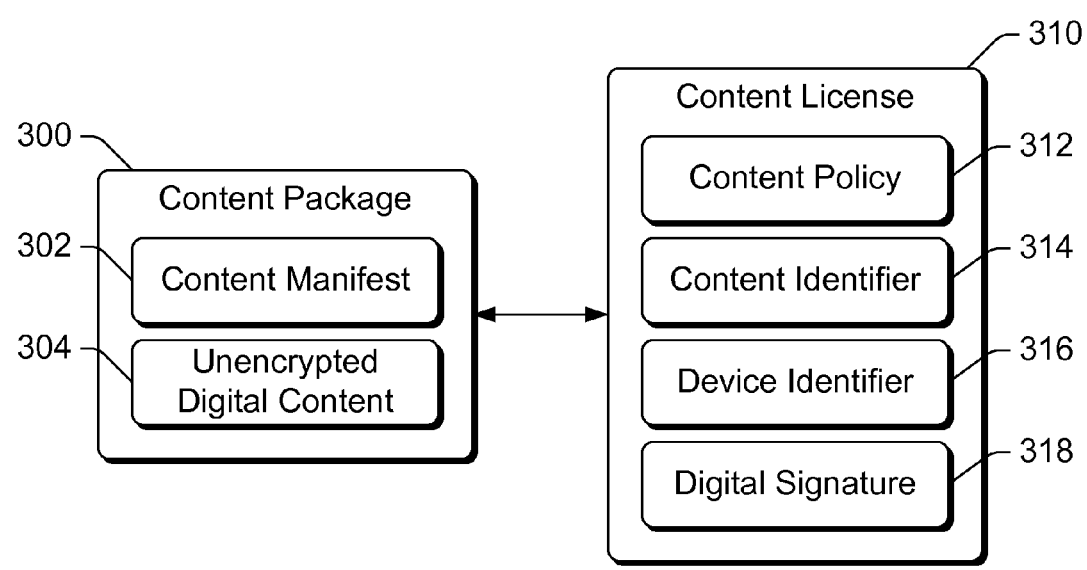
FIG. 3 illustrates another example content package and associated content license in accordance with one or more embodiments.

FIG. 3 illustrates another example content package and associated content license in accordance with one or more embodiments. FIG. 2 discussed above illustrates one example implementation of the content package and associated content; FIG. 3 illustrates an alternate implementation of the content package and associated content. Content package 300 includes a content manifest 302 and unencrypted digital content 304, analogous to content manifest 202 and unencrypted digital content 206 of FIG. 2, respectively. Unencrypted digital content 304 can remain unencrypted, analogous to unencrypted digital content 206 of FIG. 2. Content license 310 includes content policy 312, analogous to content policy 224 of FIG. 2.

Content license 310 also includes a content identifier 314, a device identifier 316, and a digital signature 318. Content identifier 314 is an identifier of unencrypted digital content 304, which can be generated in a variety of different manners as discussed above with reference to the identifier of unencrypted digital content 206 of FIG. 2. In one or more embodiments, content identifier 314 is a set of one or more hash values generated by applying a hash function to one or more portions of unencrypted digital content 304 (e.g., to one or more binaries or executable portions of unencrypted digital content 304). In one or more other embodiments, content identifier 314 is a set of one or more hash values or fingerprints generated by applying a hash function or other fingerprinting function to one or more public keys used to generate digital signatures of unencrypted digital content 304. These digital signatures can be, for example, digital signatures of binary executable files included in unencrypted digital content 304.

Device identifier 316 is an identifier of the target device of content license 310. Device identifier 316 can thus be used to indicate that content license 310 is intended for the identified target device. Device identifier 316 can take a variety of different forms. Device identifier 316 is used to distinguish different user devices from one another and thus is selected so as to uniquely (or almost uniquely) identify the target device or a set of target devices. For example, device identifier 316 can be a serial number of the target device, a GUID assigned to the target device, a hash value generated by applying a hash function to various settings or configuration information of the target device, a public key of the target device, a public key or identifier of part of the target device (e.g., of DRM module 114 of FIG. 1), and so forth. It should be noted that device identifier 316 can identify a single target device or a set of multiple target devices. For example, device identifier 316 can be an identifier of a service operator (e.g., a particular wireless carrier) so that any device using the identified service operator is identified by device identifier 316. By way of another example, device identifier 316 can an identifier of an OEM so that any device manufactured by the identified OEM is identified by device identifier 316. By way of yet another example, device identifier 316 can be an identifier of a model number so that any device having the identified model number is identified by device identifier 316.

Digital signature 318 is generated by digitally signing content identifier 314, device identifier 316, and content policy 312. Digital signature 318 is generated using the private key of the license service (e.g., license service 104 of FIG. 1), or alternatively of another trusted entity. A digital certificate of the signer includes a public key that chains to a trusted root public key (which may be the public key itself) trusted by the device for which content license 310 is intended. As the public key of the signer is thus trusted by the device for which content license 310 is intended, that device can trust digital signature 318.

Accordingly, DRM module 114 of FIG. 1 can use content identifier 314 and device identifier 316 to determine whether content license 310 is associated with content package 300. DRM module 114 can verify the trust chain for the signer certificate, and once verified use the public key of the license service (or other trusted entity that generated digital signature 318) to verify that content identifier 314, device identifier 316, and content policy 312 were not altered since digital signature 318 was generated. DRM module 114 can obtain an identifier of the device that includes DRM module 114 in a variety of different manners, depending at least in part on the manner in which device identifier 316 is selected. If the obtained identifier of the device that includes DRM module 114 is the same as device identifier 316, then DRM module 114 knows that the user device that includes DRM module 114 is the target device of content license 310. If the obtained identifier of the device that includes DRM module 114 is not the same as device identifier 316, then DRM module 114 knows that content license 310 and content package 300 are not bound to or associated with one another.

Additionally, DRM module 114 can generate a content identifier of unencrypted digital content 304. DRM module 114 can generate the content identifier in a variety of different manners, depending at least in part on the manner in which content identifier 314 is generated. If the generated content identifier is the same as content identifier 314 (and the obtained identifier of the device that includes DRM module 114 is the same as device identifier 316 as discussed above), then DRM module 114 knows that content license 310 and content package 300 are bound to or associated with one another. If the generated content identifier is not the same as content identifier 314, then DRM module 114 knows that content license 310 and content package 300 are not bound to or associated with one another.

If content license 310 is not associated with content package 300, or if digital signature 318 is not verified, then content policy 312 does not grant any rights to the user device to use unencrypted digital content 304. However, if content license 310 is associated with content package 300, then DRM module 114 permits use of unencrypted digital content 304 in accordance with content policy 312.

FIGS. 2 and 3 illustrate example embodiments of content packages. Alternatively, in one or more embodiments the unencrypted digital content can be distributed and/or maintained in other manners. For example, in FIG. 3 content license 310 can be associated with unencrypted digital content 304 and no content manifest 302 or content package 300 need be used. By way of another example, in FIG. 2 content license 220 can be associated with unencrypted digital content 206 and no content manifest 202 or content package 200 need be used. Protection object 204 and digital signature 210 can be associated with unencrypted digital content 206 in manners other than being included in content package 200 along with unencrypted digital content 206, such as by including protection object 204 and digital signature 210 in unencrypted digital content 206.

Figure 4:
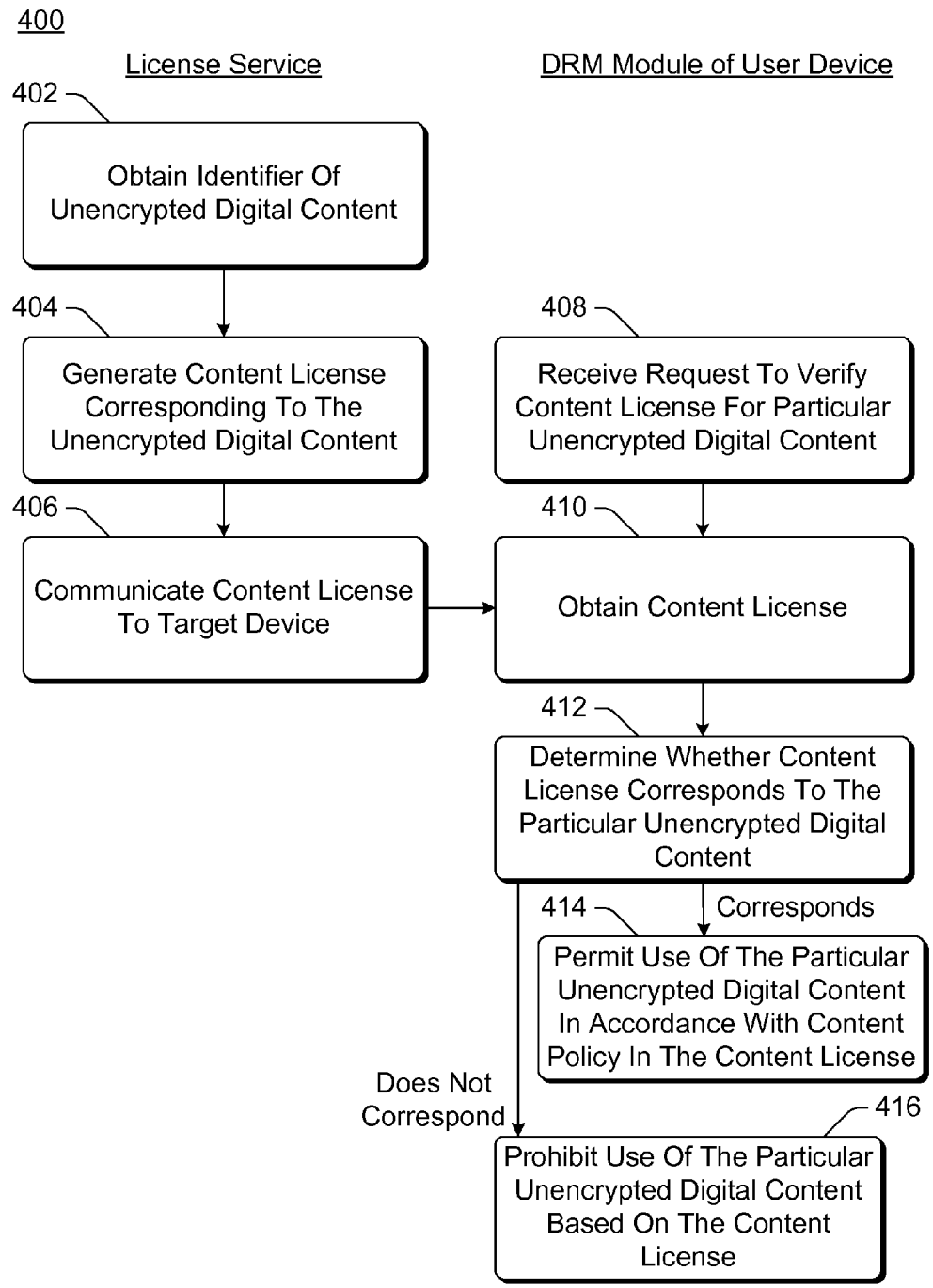
FIG. 4 is a flowchart illustrating an example process for associating policy with unencrypted digital content in accordance with one or more embodiments.

FIG. 4 is a flowchart illustrating an example process 400 for associating policy with unencrypted digital content in accordance with one or more embodiments. Process 400 can be implemented in software, firmware, hardware, or combinations thereof. Acts of process 400 illustrated on the left-hand side of FIG. 4 are carried out by a service, such as license service 104 of FIG. 1. Acts of process 400 illustrated on the right-hand side of FIG. 4 are carried out by a DRM module of a user device, such as DRM module 114 of FIG. 1. Process 400 is shown as a set of acts and is not limited to the order shown for performing the operations of the various acts. Process 400 is an example process for associating policy with unencrypted digital content; additional discussions of associating policy with unencrypted digital content are included herein with reference to different figures.

In process 400, an identifier of unencrypted digital content is obtained (act 402). The identifier of the unencrypted digital content can be generated by the license service or alternatively by another service or device. The identifier of the unencrypted digital content can be generated in different manners such as discussed above with reference to content binding value 208 of FIG. 2 and/or content identifier 314 of FIG. 3.

A content license corresponding to the unencrypted digital content is generated (act 404). The content license includes the identifier of the unencrypted digital content and a content policy. The content license is intended for a particular target device (e.g., is encrypted using the public key of the target device as discussed above). The content license can be associated with or bound to the unencrypted digital content in different matters, such as discussed above with reference to FIGS. 2 and 3.

The content license is communicated to the target device (act 406). The content license can be communicated to the target device in response to a variety of different events as discussed above.

The DRM module receives a request to verify a content license for particular unencrypted digital content (act 408). This request can be received in response to a user request to use the unencrypted digital content or alternatively can be received in response to other events. For example, a component or module of the user device may identify unencrypted digital content on a device having no content license associated therewith, and request verification of the content license for the particular unencrypted digital content prior to any user request to use the unencrypted digital content.

The DRM module obtains the content license (act 410). The content license can be obtained from the license service in response to the request in act 408, or alternatively the content license can be obtained from a license store of the user device. Multiple content licenses can be obtained in act 410 and checked to determine which is associated with the unencrypted digital content. The content license obtained can be a content license with the desired policy, or alternatively can be any content license associated with the unencrypted digital content (e.g., in situations where no particular requested action regarding the unencrypted digital content has been received).

The DRM module determines whether the content license corresponds to the particular unencrypted digital content (act 412). The unencrypted digital content can be obtained from a content service (e.g., content service 106 of FIG. 1) if not already included in a store of the user device. The manner in which the determination is made in act 412 varies based on the manner in which content licenses are associated with the unencrypted digital content (e.g., as discussed above with reference to FIGS. 2 and 3).

It should be noted that in one or more embodiments additional checks or verifications are made in act 412. For example, a digital signature in the content license (e.g., digital signature 318 of FIG. 3) can be verified in act 412. By way of another example, a check to confirm that the device identifier of the content license (e.g., device identifier 316 of FIG. 3) is the same as the device of the user device can be made in act 412.

If the content license corresponds to the particular unencrypted digital content, then use of the particular unencrypted digital content is permitted in accordance with the content policy in the content license (act 414).

If the content license does not correspond to the particular unencrypted digital content, then use of the particular unencrypted digital content based on the content license is prohibited (act 416). However, it should be noted that an additional content license may be obtained that corresponds to the particular unencrypted digital content and thus that use of the particular unencrypted digital content can still be permitted by the DRM module in accordance with the content policy in such additional content license.

It should also be noted that in process 400, use of the particular unencrypted digital content in act 414 is permitted only if the content license was intended for the user device (e.g., the content license is encrypted using the public key of the user device or includes a device identifier of the user device as discussed above). If the content license was not intended for the user device, then use of the particular unencrypted digital content based on the content license is prohibited in act 416.

Figure 5:
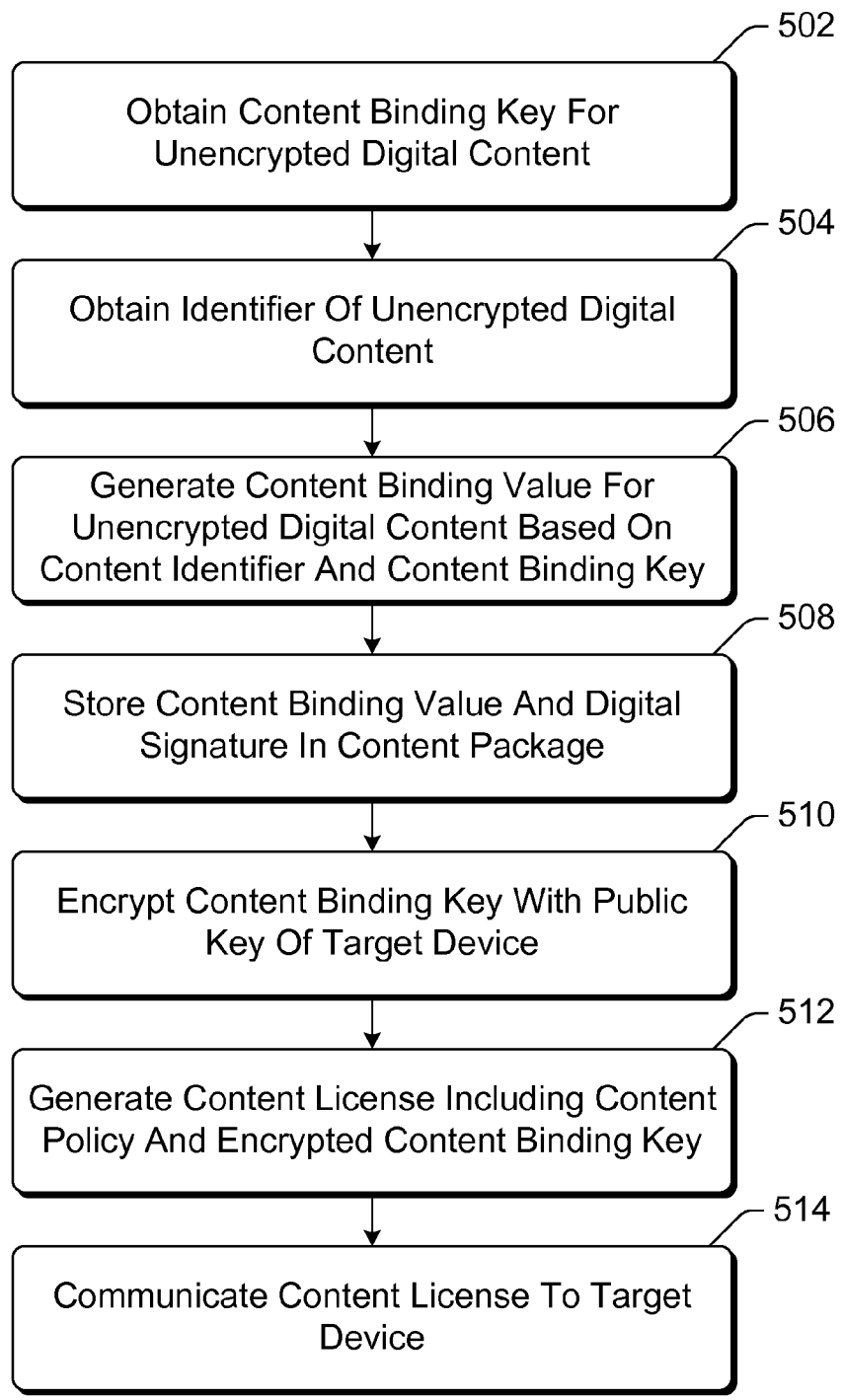
FIG. 5 is a flowchart illustrating an example process for creating a content package and a content license associated with unencrypted digital content in the content package accordance with one or more embodiments.

FIG. 5 is a flowchart illustrating an example process 500 for creating a content package and a content license associated with unencrypted digital content in the content package in accordance with one or more embodiments. Process 500 is carried out by one or more services, such as content service 106 and license service 104 of FIG. 1, and can be implemented in software, firmware, hardware, or combinations thereof. Process 500 is shown as a set of acts and is not limited to the order shown for performing the operations of the various acts. Process 500 is an example process for creating a content package and a content license associated with unencrypted digital content in the content package; additional discussions of creating a content package and a content license associated with unencrypted digital content in the content package are included herein with reference to different figures.

In process 500, a content binding key for unencrypted digital content is obtained (act 502). The content binding key is a secret key used by the content service and the license service in generating the content package and content license. The content binding key can be generated by the content service or license service, or alternatively by another service or device. Additionally, the content binding key can be maintained by the content service and/or the license service (or alternatively another trusted entity) to generate additional content licenses at later times.

An identifier of unencrypted digital content is also obtained (act 504). The content identifier obtained in act 504 can be generated or otherwise obtained in different manners such as discussed above with reference to content binding value 208 of FIG. 2.

A content binding value for unencrypted digital content is generated based on the content identifier and the content binding key (act 506). This content binding value is, for example, the content identifier obtained in act 504 encrypted using the content binding key obtained in act 502.

The content binding value is stored in the content package (act 508). The content binding value is stored in the same content package as the unencrypted digital content is stored. Additional data in a content manifest can optionally be stored in the content package as well. Alternatively, the content binding value can be stored elsewhere (e.g., in the unencrypted digital content itself). A digital signature is also included in the content package and is generated by digitally signing, for example, unencrypted digital content 206 and optionally protection object 204 and/or content manifest 202. Alternatively, portions of the content package (e.g., unencrypted digital content 206 and optionally protection object 204 and/or content manifest 202) can be stored in other integrity protected manners.

Acts 502-508 discuss creation of the content package and can be performed by, for example, the content service. Additionally, a content license can be created for a target device by, for example, the license service.

The content binding key obtained in act 502 is encrypted with a public key of the target device (act 510). This can be a public key specific to a single target device or a set of multiple target devices as discussed above. A content license is generated that includes both the content policy and the encrypted content binding key (act 512). The encrypted content binding key referred to in act 512 is the result from act 510.

The generated content license is communicated to the target device (act 514). The content binding value in the content package and the encrypted content binding key can be used to associate the content license with the content package as discussed above.

Figure 6:
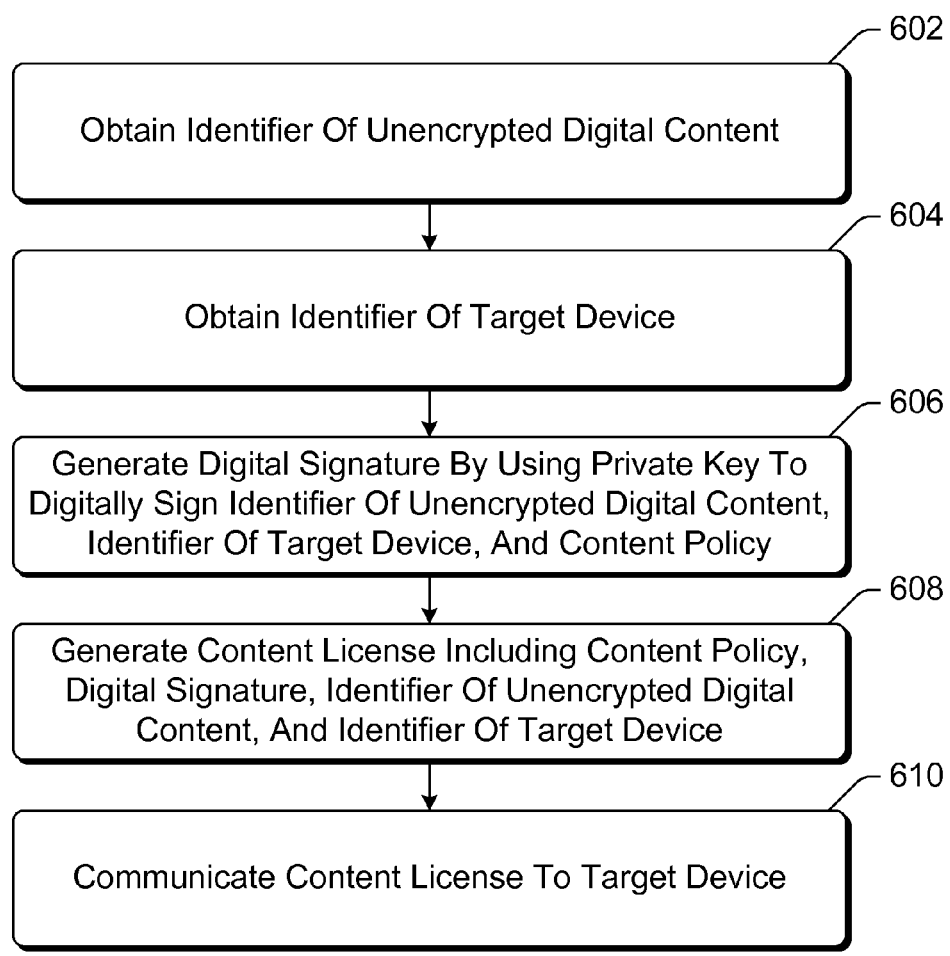
FIG. 6 is a flowchart illustrating another example process for creating a content license associated with unencrypted digital content in accordance with one or more embodiments.

FIG. 6 is a flowchart illustrating another example process 600 for creating a content license associated with unencrypted digital content in accordance with one or more embodiments. Process 600 is carried out by one or more services, such as license service 104 of FIG. 1, and can be implemented in software, firmware, hardware, or combinations thereof. Process 600 is shown as a set of acts and is not limited to the order shown for performing the operations of the various acts. Process 600 is an example process for creating a content license associated with unencrypted digital content; additional discussions of creating a content license associated with unencrypted digital content are included herein with reference to different figures.

In process 600, an identifier of unencrypted digital content is obtained (act 602). The content identifier obtained in act 602 can be generated or otherwise obtained in different manners such as discussed above with reference to content identifier 314 of FIG. 3.

An identifier of a target device is also obtained (act 604). The target device is the target device of the license being created. The identifier of the target device obtained in act 604 can be generated or otherwise obtained in different manners such as discussed above with reference to device identifier 316 of FIG. 3.

A digital signature is generated by using the private key of the license service to digitally sign the identifier of the unencrypted digital content, the identifier of the target device, and the content policy (act 606). A content license is generated that includes content policy, the digital signature, a certificate used to create the signature chaining to a trusted root, the identifier of the unencrypted digital content, and the identifier of the target device (act 608). The digital signature referred to in act 608 is the digital signature generated in act 606.

The generated content license is communicated to the target device (act 610). The content identifier and device identifier can be used to associate the content license with the unencrypted digital content for the target device.

Figure 7:
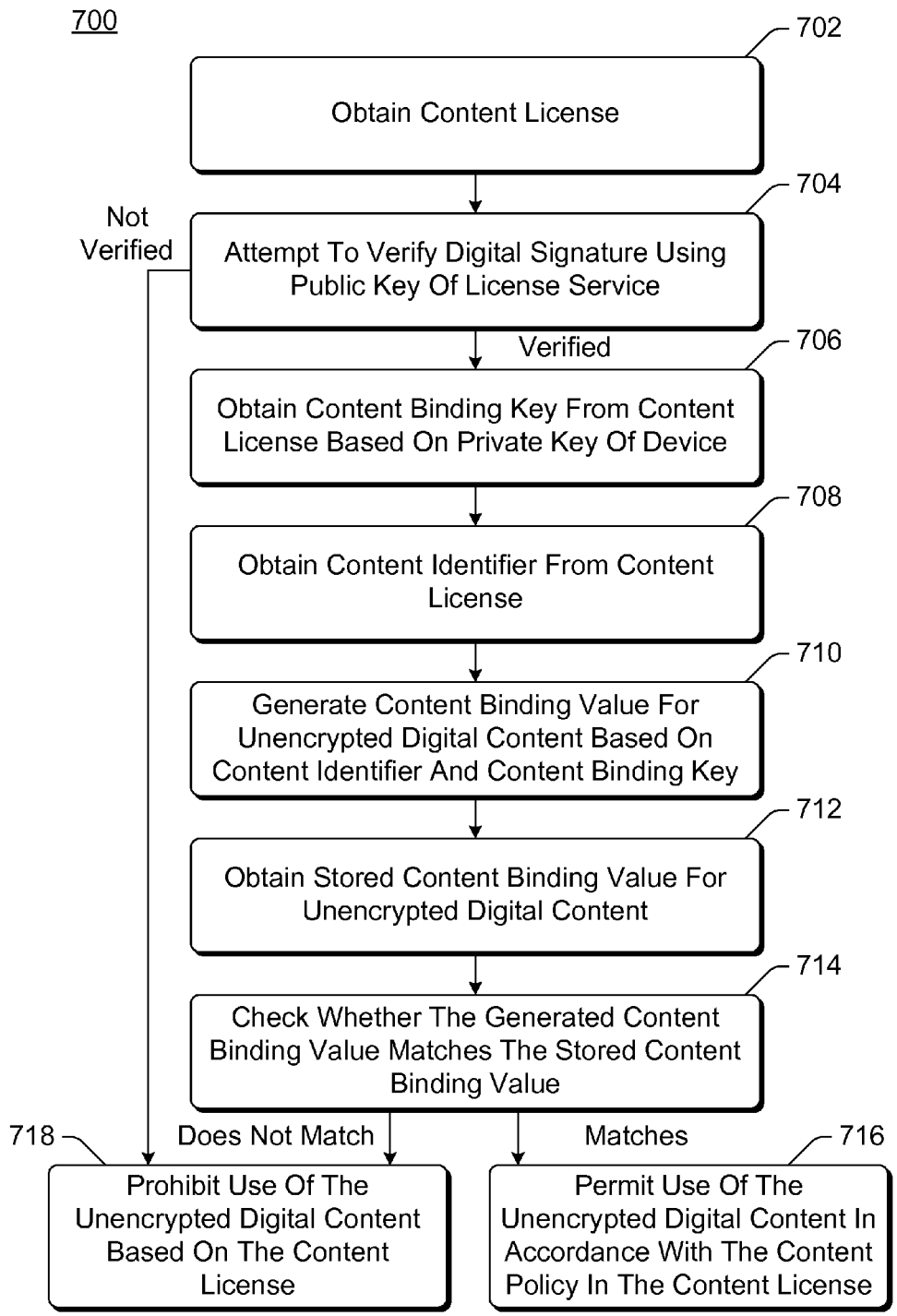
FIG. 7 is a flowchart illustrating an example process for identifying a content license associated with unencrypted digital content in accordance with one or more embodiments.

FIG. 7 is a flowchart illustrating an example process 700 for identifying a content license associated with unencrypted digital content in accordance with one or more embodiments. Process 700 is carried out by a user device, such as computing device 102 of FIG. 1, and can be implemented in software, firmware, hardware, or combinations thereof. Process 700 is shown as a set of acts and is not limited to the order shown for performing the operations of the various acts. Process 700 is an example process for identifying a content license associated with unencrypted digital content; additional discussions of identifying a content license associated with unencrypted digital content are included herein with reference to different figures.

In process 700, a content license is obtained (act 702). The content license can be obtained from a license service or from a license store of the user device. The content license obtained can be a content license with the desired policy, or alternatively can be any content license (e.g., if no particular requested action has been received).

An attempt is made to verify a digital signature in the content license (act 704). The attempt to verify the digital signature is made using a public key of the license service (or other trusted entity) that digitally signed the content license. As part of the attempt in act 704, a check is made as to whether the public key chains to a trusted root public key (which may be the public key itself) that is trusted by the device implementing process 700. Alternatively, portions of the content license (e.g., the content identifier and content binding value) can be stored in other integrity protected manners, and thus verified in act 704 in other manners.

If the digital signature in the content license is not verified, then use of the unencrypted digital content based on the content license is prohibited (act 718). However, it should be noted that an additional content license may be obtained for which the digital signature is verified, and thus that use of the unencrypted digital content could still be permitted in accordance with the content policy in this additional content license. Process 700 can optionally return to act 702, repeating process 700 with another content license.

If the digital signature in the content license is verified, then a content binding key is obtained from the content license based on a private key of the user device (act 706). The content license includes the content binding key encrypted using a public key of the user device. The key is obtained from the content license by decrypting this encrypted key using a private key of the user device.

A content identifier is also obtained from the content license (act 708). This content identifier is, for example, an identifier of unencrypted digital content in a content package.

A content binding value for the unencrypted digital content is generated based on the content identifier and the content binding key (act 710). This content binding value is generated in the same manner as the content binding value stored in the content package (or alternatively elsewhere) was generated (e.g., in act 506 of FIG. 5), such as by encrypting the content identifier using the content binding key.

The stored content binding value is also obtained (act 712). This is the content binding value stored in the content package (e.g., in act 508 of FIG. 5), or alternatively stored elsewhere.

A check is made as to whether the content binding value generated in act 708 matches (is the same as) the stored content binding value (act 714). If the content binding values match, then the content license is a content license associated with the unencrypted digital content. However, if the content binding values do not match, then the content license is not a content license associated with the unencrypted digital content.

If the content binding values in act 714 match, then use of the unencrypted digital content is permitted in accordance with the content policy in the content license (act 716).

If the content binding values in act 714 do not match, then use of the unencrypted digital content based on the content license is prohibited (act 718). However, it should be noted that an additional content license may be obtained for which the content binding values in act 714 do match, and thus that use of the unencrypted digital content could still be permitted in accordance with the content policy in such additional content license. Process 700 can optionally return to act 702, repeating process 700 with another content license.

Figure 8:
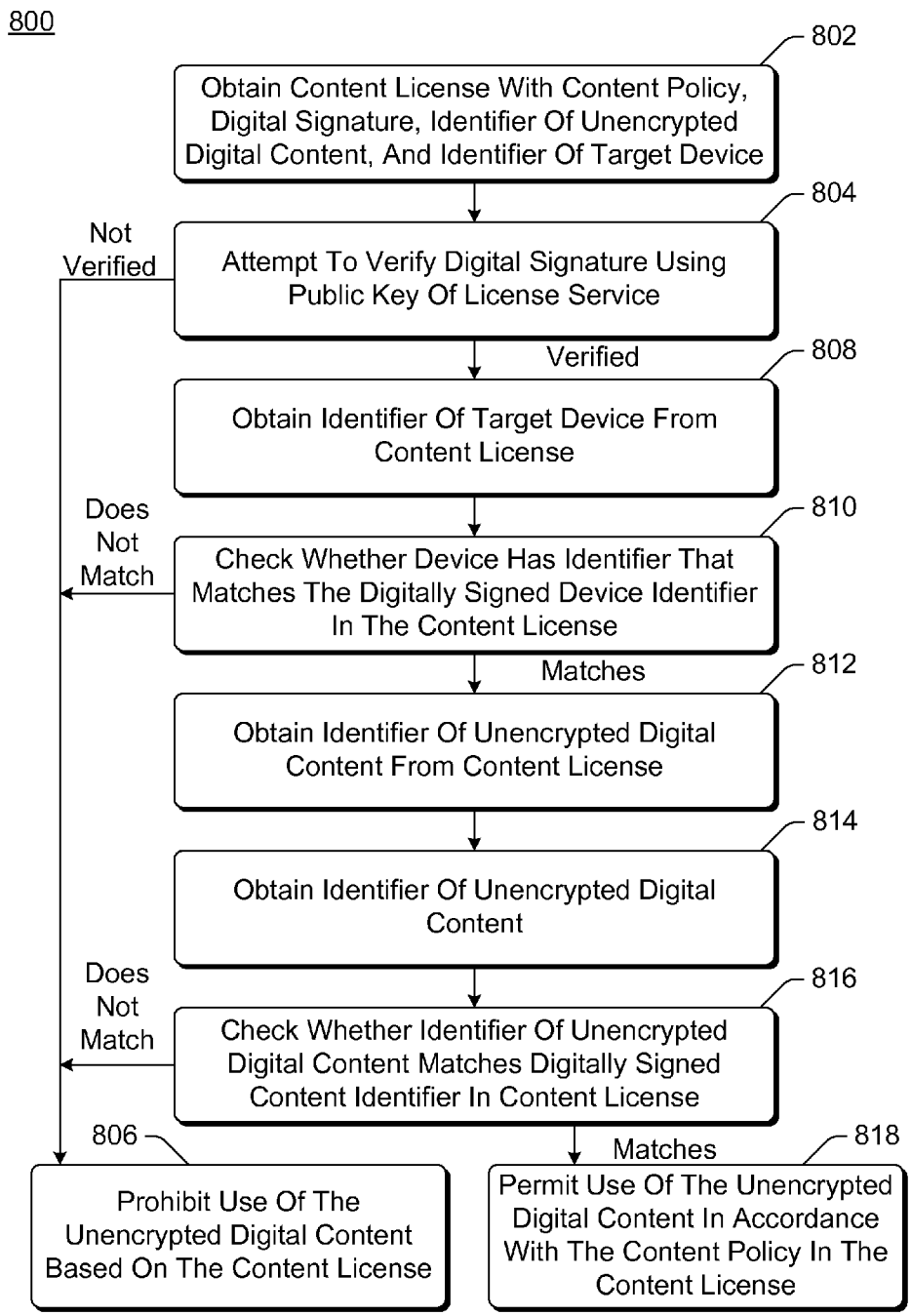
FIG. 8 is a flowchart illustrating another example process for identifying a content license associated with unencrypted digital content in accordance with one or more embodiments.

FIG. 8 is a flowchart illustrating another example process 800 for identifying a content license associated with unencrypted digital content in accordance with one or more embodiments. Process 800 is carried out by a user device, such as computing device 102 of FIG. 1, and can be implemented in software, firmware, hardware, or combinations thereof. Process 800 is shown as a set of acts and is not limited to the order shown for performing the operations of the various acts. Process 800 is an example process for identifying a content license associated with unencrypted digital content; additional discussions of identifying a content license associated with unencrypted digital content are included herein with reference to different figures.

In process 800, a content license is obtained (act 802). The content license obtained can be a content license with the desired policy, or alternatively can be another content license (e.g., in situations where no particular requested action regarding unencrypted digital content has been received). The content license includes content policy, a digital signature by a license service, an identifier of unencrypted digital content, and an identifier of a target device. The content license can be obtained from a license service or from a license store of the user device. The digital signature is a digital signature generated by digitally signing the identifier of the unencrypted digital content, the identifier of the target device, and the content policy.

An attempt is made to verify the digital signature in the content license (act 804). The attempt to verify the digital signature is made using a public key of the license service (or other trusted entity) that digitally signed the content license. As part of the attempt in act 804, a check is made as to whether the public key chains to a trusted root public key (which may be the public key itself) that is trusted by the device implementing process 800.

If the digital signature in the content license is not verified, then use of the unencrypted digital content based on the content license is prohibited (act 806). However, it should be noted that an additional content license may be obtained for which the digital signature is verified, and thus that use of the unencrypted digital content can still be permitted in accordance with the content policy in this additional content license. Process 800 can optionally return to act 802, repeating process 800 with another content license.

If the digital signature in the content license is verified, then an identifier of the target device is obtained from the content license (act 808).

A check is made as to whether the device implementing process 800 has an identifier that matches (is the same as) the digitally signed target device identifier in the content license (act 810). This identifier of the device implementing process 800 can be a variety of different identifiers such as discussed above with reference to device identifier 316 of FIG. 3. If the device implementing process 800 does not have an identifier that matches the digitally signed target device identifier in the content license, then use of the unencrypted digital content based on the content license is prohibited (act 806).

If the device implementing process 800 does have an identifier that matches the digitally signed target device identifier in the content license, then an identifier of the unencrypted digital content is obtained from the content license (act 812).

An identifier of the unencrypted digital content itself is also obtained (act 814). This identifier is obtained from the unencrypted digital content itself (e.g., in the content package), and is obtained in the same manner as was used to obtain the identifier of the unencrypted digital content for inclusion in the content license (e.g., in act 602 of FIG. 6).

A check is made as to whether the identifier of the unencrypted digital content obtained from the content license matches (is the same as) the identifier of the unencrypted digital content itself (act 816).

If the identifier of the unencrypted digital content obtained from the content license does not match the identifier of the unencrypted digital content itself (e.g., in the content package), then use of the unencrypted digital content based on the content license is prohibited (act 806).

However, if the identifier of the unencrypted digital content obtained from the content license matches the identifier of the unencrypted digital content itself (e.g., in the content package), then use of the unencrypted digital content is permitted in accordance with the content policy in the content license (act 818).

Figure 9:
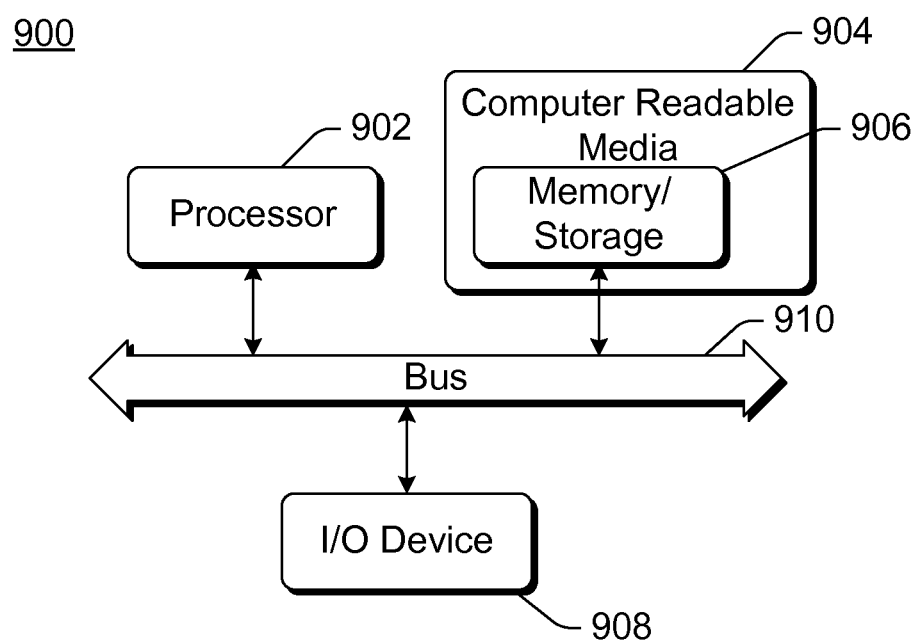
FIG. 9 illustrates an example computing device that can be configured to implement the associating policy with unencrypted digital content in accordance with one or more embodiments.

FIG. 9 illustrates an example computing device 900 that can be configured to implement the associating policy with unencrypted digital content in accordance with one or more embodiments. Computing device 900 can be, for example, computing device 102 of FIG. 1, or a computing device of license service 104 or content service 106 of FIG. 1.

Computing device 900 includes one or more processors or processing units 902, one or more computer readable media 904 which can include one or more memory and/or storage components 906, one or more input/output (I/O) devices 908, and a bus 910 that allows the various components and devices to communicate with one another. Computer readable media 904 and/or one or more I/O devices 908 can be included as part of, or alternatively may be coupled to, computing device 900. Bus 910 represents one or more of several types of bus structures, including a memory bus or memory controller, a peripheral bus, an accelerated graphics port, a processor or local bus, and so forth using a variety of different bus architectures. Bus 910 can include wired and/or wireless buses.

Memory/storage component 906 represents one or more computer storage media. Component 906 can include volatile media (such as random access memory (RAM)) and/or non-volatile media (such as read only memory (ROM), Flash memory, optical disks, magnetic disks, and so forth). Component 906 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 902. It is to be appreciated that different instructions can be stored in different components of computing device 900, such as in a processing unit 902, in various cache memories of a processing unit 902, in other cache memories of device 900 (not shown), on other computer readable media, and so forth. Additionally, it is to be appreciated that the location where instructions are stored in computing device 900 can change over time.

One or more input/output devices 908 allow a user to enter commands and information to computing device 900, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 9. The features of the associating policy with unencrypted digital content techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   under control of one or more hardware processors with executable instructions:
   obtaining an identifier of unencrypted digital content, the identifier of the unencrypted digital content comprising a value generated by applying a hash function to one or more public keys used to generate digital signatures of one or more portions of the unencrypted digital content;
   generating a content license intended for a target device and associated with the unencrypted digital content, the content license including the identifier of the unencrypted digital content, an encrypted content binding key, and a content policy, the identifier of the unencrypted digital content and the encrypted content binding key usable to determine whether the content license corresponds to the unencrypted digital content, the generating including encrypting a content binding key with a public key of the target device, the content binding key usable to generate a content binding value for the unencrypted digital content by using the content binding key to encrypt the identifier of the unencrypted digital content; and communicating the content license to the target device, allowing the target device to use the unencrypted digital content only in accordance with the content policy in the content license associated with the unencrypted digital content.

2. A method as recited in claim 1, wherein the content binding value and the unencrypted digital content are stored in a digitally signed content package.

3. A method as recited in claim 1, wherein generating the content license comprises:

generating a digital signature by digitally signing the identifier of the unencrypted digital content, an identifier of the target device, and the content policy; and including both the identifier of the target device and the digital signature in the content license.

4. A method as recited in claim 3, wherein the identifier of the target device comprises frail the public key of the target device.

5. A method as recited in claim 3, wherein the identifier of the target device comprises an identifier of a service operator of the target device.

6. A method as recited in claim 1, the method further comprising trusting the target device to enforce the content license.

7. One or more computer storage memories having stored thereon multiple instructions execution of which by one or more processors of a computing device cause the one or more processors to:

obtain an identifier of unencrypted digital content, the identifier of the unencrypted digital content comprising a value generated by applying a hash function to one or more public keys used to generate digital signatures of one or more portions of the unencrypted digital content;

generate a content license intended for a target device and associated with the unencrypted digital content, the content license including the identifier of the unencrypted digital content, an encrypted content binding key, and a content policy, the identifier of the unencrypted digital content and the encrypted content binding key usable to determine whether the content license corresponds to the unencrypted digital content, the generating including encrypting a content binding key with a public key of the target device, the content binding key usable to generate a content binding value for the unencrypted digital content by using the content binding key to encrypt the identifier of the unencrypted digital content; and communicate the content license to the target device, allowing the target device to use the unencrypted digital content only in accordance with the content policy in the content license associated with the unencrypted digital content.

8. One or more computer storage memories as recited in claim 7, wherein both the content binding value and the unencrypted digital content are stored in a digitally signed content package.

9. One or more computer storage memories as recited in claim 7, wherein to generate the content license comprises generating a digital signature by digitally signing the identifier of the unencrypted digital content, an identifier of the target device, and the content policy.

10. One or more computer storage memories as recited in claim 9, wherein to generate the content license further comprises including both the identifier of the target device and the digital signature in the content license.

11. One or more computer storage memories as recited in claim 9, wherein the identifier of the target device comprises the public key of the target device.

12. One or more computer storage memories as recited in claim 9, wherein the identifier of the target device comprises an identifier of a service operator of the target device.

13. One or more computer storage memories as recited in claim 7, the one or more processors further caused to trust the target device to enforce the content license.

14. A system comprising:

one or more processors; and memory storing instructions which, responsive to execution by the one or more processors, cause the one or more processors to:

obtain an identifier of unencrypted digital content, the identifier of the unencrypted digital content comprising a value generated by applying a hash function to one or more public keys used to generate digital signatures of one or more portions of the unencrypted digital content;

generate a content license intended for a target device and associated with the unencrypted digital content, the content license including the identifier of the unencrypted digital content, an encrypted content binding key, and a content policy, the identifier of the unencrypted digital content and the encrypted content binding key usable to determine whether the content license corresponds to the unencrypted digital content, the generating including encrypting a content binding key with a public key of the target device, the content binding key usable to generate a content binding value for the unencrypted digital content by using the content binding key to encrypt the identifier of the unencrypted digital content; and communicate the content license to the target device, allowing the target device to use the unencrypted digital content only in accordance with the content policy in the content license associated with the unencrypted digital content.

15. A system as recited in claim 14, wherein both the content binding value and the unencrypted digital content are stored in a digitally signed content package.

16. A system as recited in claim 14, wherein to generate the content license comprises generating a digital signature by digitally signing the identifier of the unencrypted digital content, an identifier of the target device, and the content policy.

17. A system as recited in claim 16, wherein to generate the content license further comprises including both the identifier of the target device and the digital signature in the content license.

18. A system as recited in claim 16, wherein the identifier of the target device comprises the public key of the target device.

19. A system as recited in claim 14, wherein the target device is one of a set of target devices allowed to use the content license.

20. A system as recited in claim 14, the one or more processors further caused to trust the target device to enforce the content license.

* * * * *